(12) United States Patent
Schaffer

(10) Patent No.: US 9,954,814 B1
(45) Date of Patent: *Apr. 24, 2018

(54) SYSTEMS AND METHODS FOR VERIFICATION AND MAPPING OF SOCIAL CONNECTIONS

(71) Applicant: Marshall Schaffer, Vancouver, WA (US)

(72) Inventor: Marshall Schaffer, Vancouver, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/648,346

(22) Filed: Jul. 12, 2017

Related U.S. Application Data

(63) Continuation of application No. 15/412,973, filed on Jan. 23, 2017.

(51) Int. Cl.
  *G06F 15/16* (2006.01)
  *H04L 12/58* (2006.01)
  *G06Q 50/00* (2012.01)
  *H04L 29/06* (2006.01)

(52) U.S. Cl.
  CPC ............. *H04L 51/32* (2013.01); *G06Q 50/01* (2013.01); *H04L 63/102* (2013.01)

(58) Field of Classification Search
  CPC ........ H04L 51/32; H04L 63/102; G06Q 50/01
  See application file for complete search history.

(56) References Cited

U.S. PATENT DOCUMENTS

| | | | |
|---|---|---|---|
| 8,402,512 B2* | 3/2013 | Tam et al. | G06F 7/04 |
| 9,215,236 B2* | 12/2015 | Kennedy | H04L 63/102 |
| 9,563,782 B1* | 2/2017 | Brisebois | G06F 21/62 |
| 9,800,563 B2* | 10/2017 | Li et al. | H04L 63/08 |
| 2014/0245403 A1* | 8/2014 | Li et al. | H04L 63/08 |
| 2015/0206113 A1* | 10/2015 | Stoll et al. | G06Q 20/127 |
| 2015/0278917 A1* | 10/2015 | Stoll et al. | G06Q 30/0631 |
| 2015/0278918 A1* | 10/2015 | Stoll et al. | G06Q 30/0631 |
| 2015/0278919 A1* | 10/2015 | Stoll et al. | G06Q 30/0631 |
| 2015/0350038 A1* | 12/2015 | Mohan et al. | H04L 43/04 |

* cited by examiner

*Primary Examiner* — Moustafa M Meky
(74) *Attorney, Agent, or Firm* — Elliott, Ostrander & Preston, P.C.

(57) ABSTRACT

Systems and methods including computer-executable software for receiving user information, receiving a user request to connect with another user, computing a trust index for the requesting user, and allowing the connection request if the user's trust index is sufficiently high. In some examples, the system includes software for mapping connection and potential connections between the user and a target entity. In some further examples, the systems and methods includes functionality for allowing a user to message other users.

21 Claims, 8 Drawing Sheets

SYSTEMS AND METHODS FOR VERIFICATION AND MAPPING OF SOCIAL CONNECTIONS

BACKGROUND

The present disclosure relates generally to computerized social networks. In particular, social networks that include systems and methods for verification of user connections to a target entity such as another user or corporation through a series of one or more intermediate entities, and for generating a graph of connections from the user to the target entity, are described.

Social media platforms have become a staple in on-line interactions. The rise of platforms such as Facebook® and LinkedIn® offer a virtual means for people to network, both for business purposes as well as entertainment and personal connections. Such platforms have become ubiquitous to the point where persons of all walks of life now use at least one, and often multiple, social media platforms. In the case of high profile users such as celebrities, politicians, musicians, actors, etc., private users may be interested to know how connected they are to such high profile users for entertainment and/or, in the case of business dealings, to further professional and business goals.

Known social networking platforms are not entirely satisfactory for these ranges of applications. For example, existing social networking platforms typically allow users to enter personal information and then identify contacts with whom to connect. The designated contacts are typically notified of the connection request, and can decide whether to allow the connection, or reject it. Screening or vetting of a potential connection request is limited solely to the request recipient deciding whether to allow it. For connections that the recipient does not know personally, which often comprise the bulk of social media connections, the recipient only has what profile data is available on the user to rely upon in deciding whether to connect. There is no more reliable method for ascertaining the user's truthfulness.

In addition, conventional social media platforms typically do not provide significant information about connections of connections. Some platforms indicate what level of connectedness a user has to potential contacts or other target entities, e.g. first degree for direct connections, second degree for connections of direct connections, etc. However, these platforms typically do not provide a means by which a user can see the connection path to a given target entity. In certain contexts, such as business dealings, or even for fun discussions with friends, specific connection information for chains of connections would be valuable information, allowing a user to know specifically who to contact to further interests towards a target entity.

Thus, there exists a need for social media platforms that improve upon and advance the design of known social media platforms. Examples of new and useful social media platform systems and methods relevant to the needs existing in the field are discussed below.

SUMMARY

A first aspect of the present disclosure is directed to a system for mapping social connections between a user and a specified target entity, comprising a processor capable of executing software instructions, a user interface in communication with the processor, and a storage unit in communication with the processor. The storage unit includes a database and software instructions to add the user to the database, compute a trust index for the user, allow the user to use the user interface to select one or more other persons within the database to establish a connection, each of the one or more other persons within the database having established connections with other existing persons in the database, evaluate whether to allow the connection based upon the user's trust index, and create a graph of connections between the user and the specified target entity based upon the one or more other persons with whom the user has established a connection.

In one embodiment, the user is only allowed to select another person within the database to establish a connection if the user meets criteria specified by the other person.

In another embodiment, the system further comprises an interface to display a visual depiction of the graph of connections between the user and the specified target entity.

In another embodiment, the interface to display a visual depiction of the graph and the user interface further comprise code that is useable by a web browser to display the interface and user interface.

In still another embodiment, the specified target entity is a publicly known person.

In another embodiment, the system further comprises software instructions to allow the user to message other persons within the database via the user interface.

In yet another embodiment, the user can message other persons only within parameters prescribed by the other person.

According to another aspect of the disclosed invention, a method for mapping social connections between a user and a specified target entity comprises providing a user interface upon a computer with a processor, receiving into the computer via the user interface information about a plurality of persons, where at least one of the plurality of persons is the specified target entity; receiving into the computer via the user interface information about connections between at least one of the plurality of persons, and a second of the plurality of persons; receiving from the user into the computer via the user interface information about the user's connection with at least one of the plurality of persons; computing a trust index for the user, validating the user's connection with the at least one of the plurality of persons based upon criteria specified by the at least one of the plurality of persons and the user's trust index; using the computer to create a graph of connections between the user and the specified target entity from the information about connections; and displaying the graph on the user interface.

In one embodiment, the method further comprises sending a message from the user to the specified target entity.

In another embodiment, the content of the message sent from the user is limited according to criteria established by the specified target entity.

In another embodiment, the method further comprises recomputing the user's trust index following validation and approval of a connection request from the user.

In yet another embodiment, the connection request from the user is automatically denied if the user's trust index is below an established threshold.

In another embodiment, the specified person is either an actor, a musician, or an athlete.

In another embodiment, the method further comprises receiving one or more subsequent requests to add additional persons into the computer; and recomputing the user's trust index following receipt of each subsequent request.

In another embodiment, receiving into the computer further comprises storing received information into a database.

In another embodiment, receiving via the user interface further comprises receiving information from a web browser displaying the user interface.

In still another embodiment, displaying the graph further comprises displaying the graph on the web browser.

According to yet another aspect of the present invention, a system for mapping social connections between a user and a specified target entity comprises a server computer, which further comprises a processor capable of executing computer instructions, a communications device in data communication with the processor and a network, and a storage unit in data communication with the processor. The storage unit contains a database containing information about a plurality of persons, including the specified target entity, the information further comprising a computed trust index for the user, computer instructions for receiving information for storage in the database about the user, including a connection between the user and at least one of the plurality of persons, the connection being subject to validation based upon criteria set by the at least one of the plurality of persons and the user's trust index; computer instructions for displaying a user interface on a client computer, and computer instructions for determining a graph of connections linking the user to the specified target entity. The system includes a client computer further comprising a processor capable of executing computer instructions; a communications device in data communication with the processor and the network so as to be able to communicate with the server computer, and a storage unit in data communication with the processor, the storage unit containing instructions for displaying the user interface upon receiving instructions from the client computer, wherein the user interface allows the user to input information about the user to be sent to the server computer, and to receive a depiction of the graph of connections.

According to one embodiment, the user interface is displayed on the client computer in a web browser.

According to another embodiment, the information about a plurality of persons further comprises login credentials corresponding to each of the plurality of persons so that each of the plurality of persons can log into the server computer to view or modify the information.

According to still another embodiment, the user interface allows the user using the client computer to send a message to one of the plurality of persons, provided the message complies with criteria established by the one of the plurality of persons.

DETAILED DESCRIPTION

The disclosed systems and methods for verification and mapping of social connections will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various systems and methods for verification and mapping of social connections are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Figure 1:
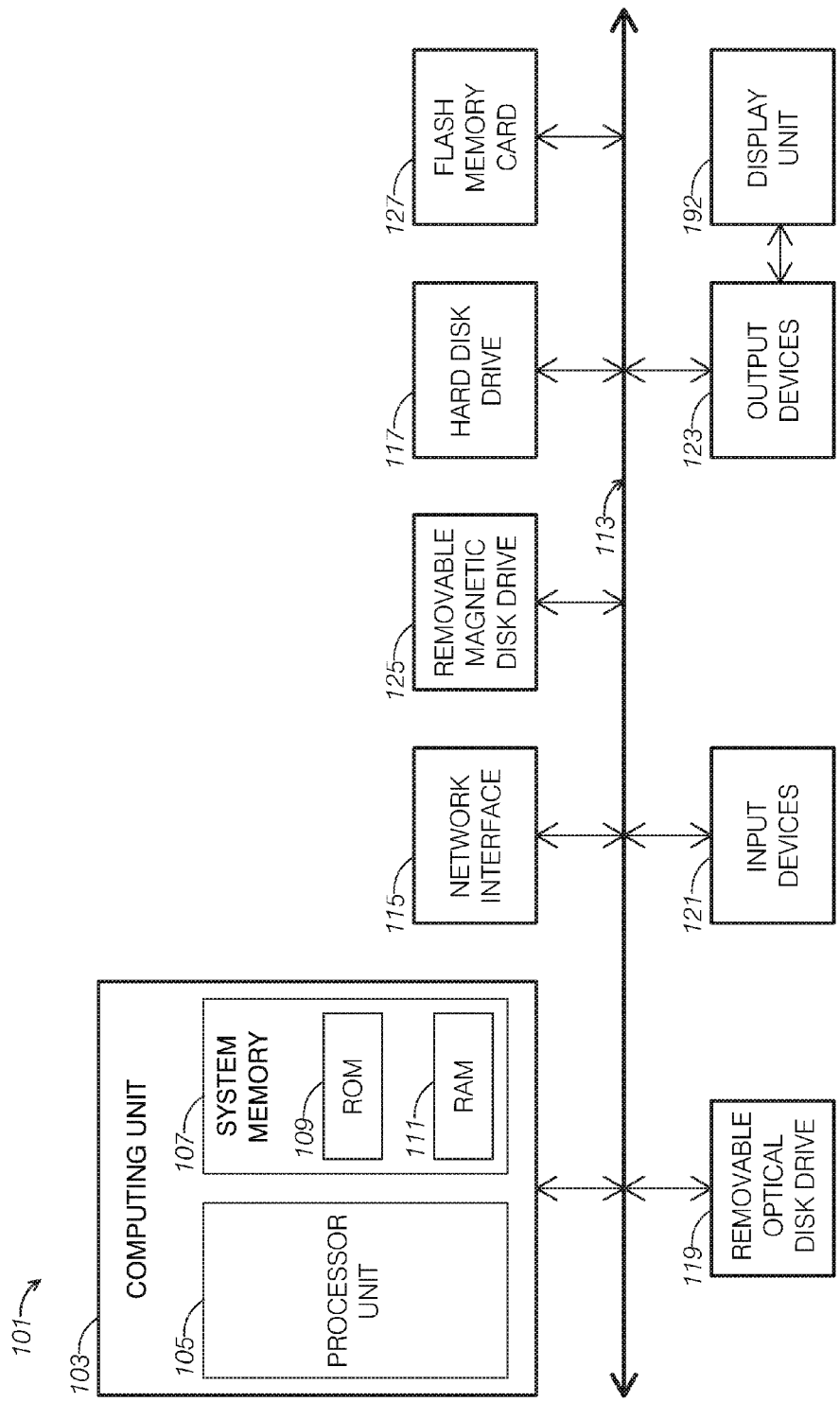
FIG. 1 shows a schematic view of an example of a programmable computing device.

Accordingly, FIG. 1 shows one illustrative example of a computer, computer 101, which can be used to implement various embodiments of the invention. Computer 101 may be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123. Input devices 121 may include, for example, a keyboard, touch screen, a remote control pad, a pointing device (such as a mouse, touchpad, stylus, trackball, or joystick), a scanner, a camera or a microphone. Output devices 123 may include, for example, a monitor display, an integrated display, television, printer, stereo, or speakers.

Still further, computing unit 103 will be directly or indirectly connected to one or more network interfaces 115 for communicating with a network. This type of network interface 115 is also sometimes referred to as a network adapter or network interface card (NIC). Network interface 115 translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to a digital music player, such as an IPOD® brand digital music player or iOS or Android based smartphone. As known in the art, this type of digital music player can serve as both an output device for a computer (e.g., outputting music from a sound file or pictures from an image file) and a storage device.

In addition to a digital music player, computer 101 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It should be appreciated that a computing device employed according to the various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computers may define mobile electronic devices, such as smartphones, tablet computers, or portable music players, often operating the iOS, Symbian, Windows-based (including Windows Mobile and Windows 8), or Android operating systems.

Figure 2:
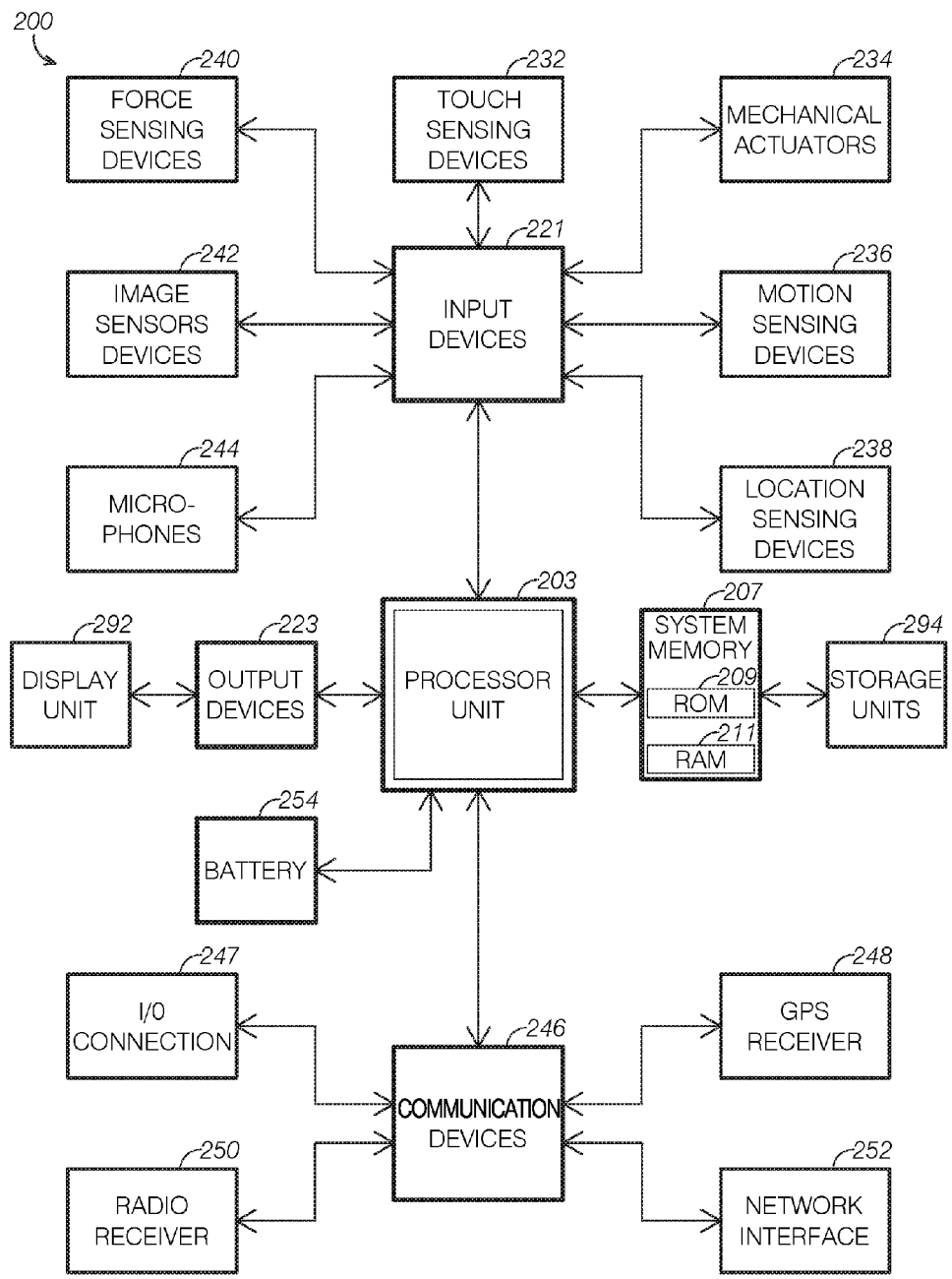
FIG. 2 shows a schematic view of an example of a mobile electronic device.

With reference to FIG. 2, an exemplary mobile device, mobile device 200, may include a processor unit 203 (e.g., CPU) configured to execute instructions and to carry out operations associated with the mobile device. For example, using instructions retrieved from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well known operating systems such as iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211, etc. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. In particular, input devices 221 may include the following: touch sensing devices 232 such as touch screens, touch pads and touch sensing surfaces; mechanical actuators 234 such as button or wheels or hold switches; motion sensing devices 236 such as accelerometers; location detecting devices 238 such as global positioning satellite receivers, WiFi based location detection functionality, or cellular radio based location detection functionality; force sensing devices 240 such as force sensitive displays and housings; image sensors 242; and microphones 244. Input devices 221 may also include a clickable display actuator.

Mobile device 200 also includes various output devices 223 that are operatively coupled to processor unit 203. Output devices 223 are configured to transfer data from mobile device 200 to the outside world. Output devices 223 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

With reference to FIGS. 1-7, a first example of a system, system 300, will now be described. System 300 functions to provide a way to verify the truthfulness and reliability of a user making a connection request with a target entity, as well as to visually show a user a graphical connection chain with a target entity with whom the user may not yet be connected. The reader will appreciate from the figures and description below that system 300 addresses shortcomings of conventional social media systems and methods.

For example, system 300 computes and provides a trust index for each user of system 300 as a quantifiable measure of the reliability and likely truthfulness of a user requesting a connection. Further, system 300 can provides enhanced connectivity information for users to a given target entity. As mentioned in the background, a target entity is potentially any other user of system 300, and in some implementations, can include entities such as organizations and corporations. Rather than simply displaying a level of connectedness, viz. the number of connected users between a user and a target entity, system 300 can provide a visual display of the connection path, and where intermediate users so permit, also identify intermediate connections. With this information, a user can strategically plan how to further closer communications with target entities.

System 300 has multiple possible uses. Many people may wish to know how connected they are to various recognized persons in society and/or their personal interest circles, for purposes of curiosity, bragging rights, or to potentially get to meet the recognized person. Alternatively or additionally, system 300 can be deployed in the context of businesses, where employees, managers and executives can use system 300 to determine connections between the constituents of various corporate and organizational boards, executive suites, etc. System 300 further can be deployed to show a network or networks between executives who may sit on the boards of multiple companies; such information can be useful for investment and/or regulatory disclosure purposes, e.g. to determine potential conflicts of interest.

Figure 3:
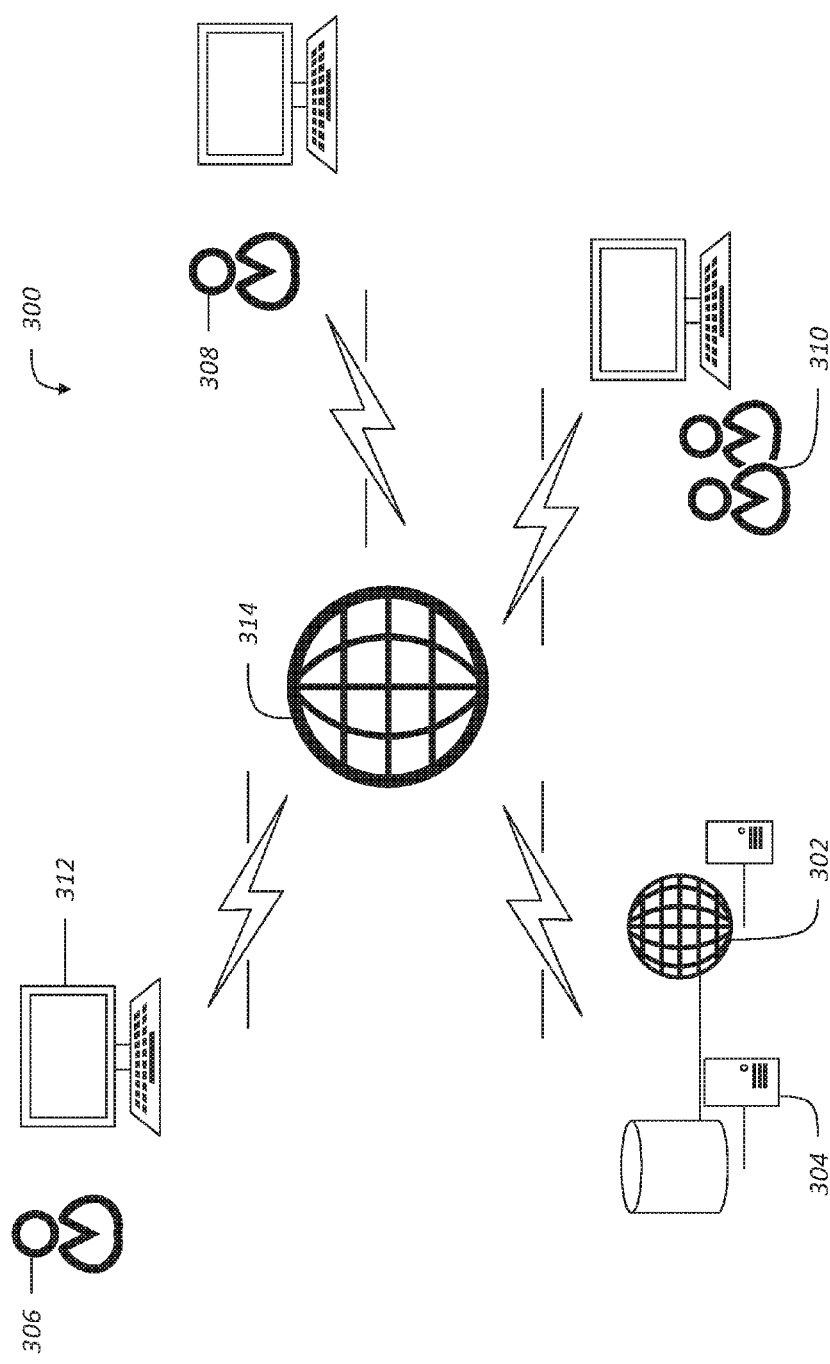
FIG. 3 is a diagram view of the components of an example system for verification and mapping of social connections.

FIG. 3 depicts a diagram for a possible implementation of system 300 for establishing connections to a specified target entity 308. System 300 is preferably implemented in software, which includes software instructions for instructing a web server 302 to generate a user interface. Web server 302 preferably is in communication with a database 304. Software instructions are included to add a user 306 to database 304, and compute a trust index for user 306. User 306 can use the user interface to select one or more other persons 310 within database 304 to establish a connection, each of the one or more other persons 310 within database 304 having established connections with still other existing persons 310 in database 304. Each one or more other person 310 receiving a connection request 308 can evaluate whether to accept user 306's connection request based upon user's 306 trust index. User 306 can further use the user interface to create a graph of connections between user 306 and the specified target entity 308 in database 304 based upon the one or more other persons 310 with whom user 306 has established a connection.

In addition to web server 302 and database 304, the various users including user 306, target entity 308, and other existing persons 310 preferably interact with system 300 via one or more user terminals 312. Web server 302, database 304 and user terminals 312 are in turn connected via a network 314. Web server 302, database 304 and user terminals 312 are preferably deployed on one or more computer systems similar to computer 101 and/or mobile device 200. Network 314 is preferably the Internet, but can be any network implementation that allows the various components of system 300 to maintain data communication. Examples of such networks include local area networks connected by WiFi and/or Ethernet technologies, private wide area networks implemented using fiber optics and various WAN network technologies well known in the relevant art, or public wide area networks such as the Internet.

Web server 302 is preferably implemented using any technology now known or later developed for deploying web sites, and database 304 is likewise preferably implemented using any technology now known or later developed for data storage, organization and retrieval. Such implementations contemplate well-known web architectures with a corresponding web browser on user terminals 312; however, other implementations may contemplate a client-server model that interfaces with a dedicated app that can run on user terminal 312. Such an architecture may be appropriate where system 300 is to be deployed across mobile devices. Still other implementations can use a combination of any of the foregoing. Furthermore, web server 302 and database 304 may, in many implementations, be deployed on a single computer platform. In other implementations, web server 302 and database 304 may be deployed in a data center context, across multiple machines or clusters of machines. In still other implementations, web server 302 and/or database 304 may be implemented in a cloud environment, with web and database services being deployed using remote hosting services.

Figure 4:
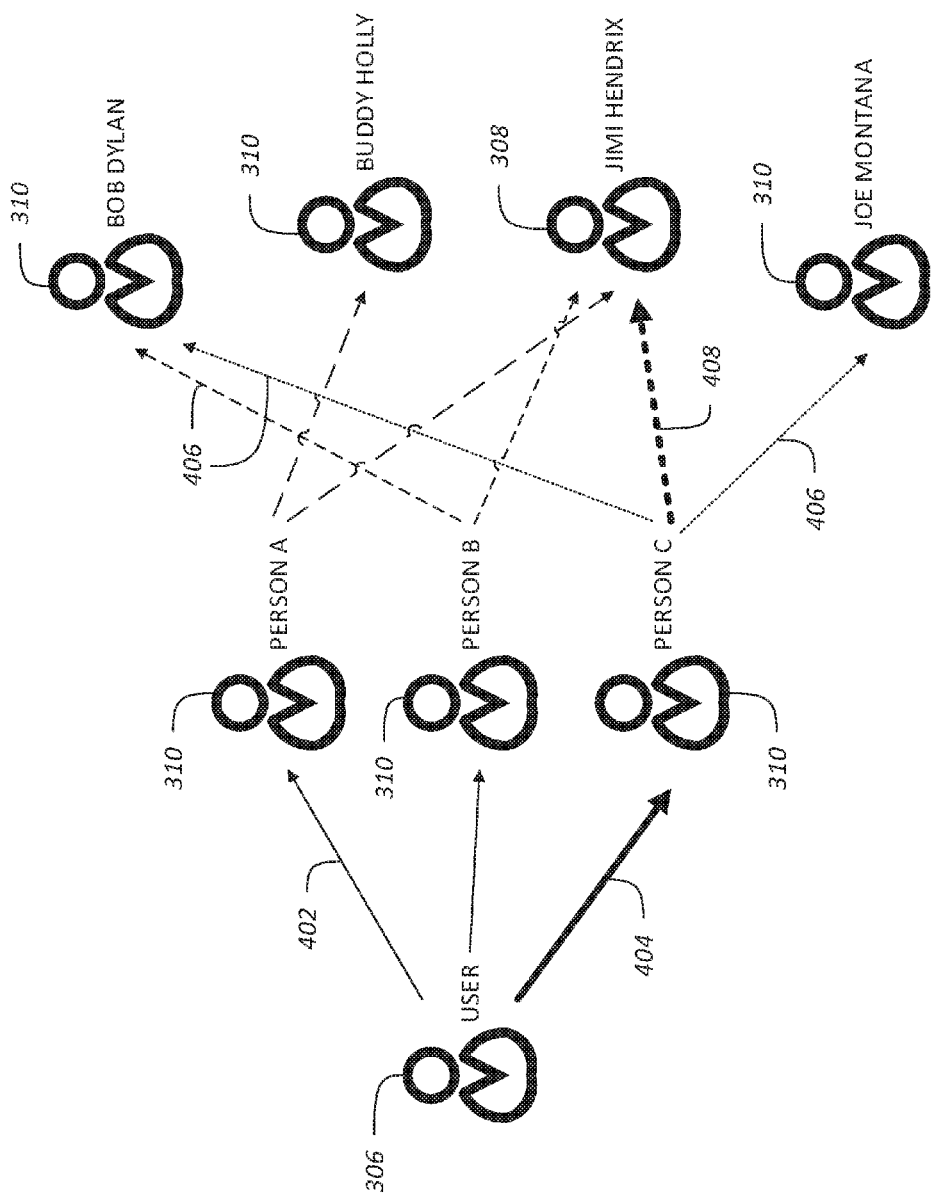
FIG. 4 is a diagram of a network of social connections generated and maintained by the disclosed systems and methods for verification and mapping of social connections.

In FIG. 4, the basic conceptual structure of users of system 300 is seen from the perspective of a user 306. User 306 has one or more connections 402 to other existing persons 310, which in turn can have one or more connections 406 with more existing persons 310 and a specified target entity 308. When determining a connection path from user 306 to target entity 308, connections 404 and 408 provide a series of direct links. As will be discussed in greater detail below, the path defined by connections 404 and 408 can be graphically displayed to a user upon request. The reader will observe that there are multiple possible paths from user 306 to specified target entity 308, namely through both person A and person B. This will not always be the case, and is provided here for example purposes only. In many instances, it is expected that only one path would be available between a given user 306 and specified target entity 308. Furthermore, although only a single level of existing persons 310 is present between user 306 and specified target entity 308, it will be appreciated by a person skilled in the relevant art that multiple layers of connections may be necessary to traverse to establish a connection path between user 306 and target entity 308.

Figure 5:
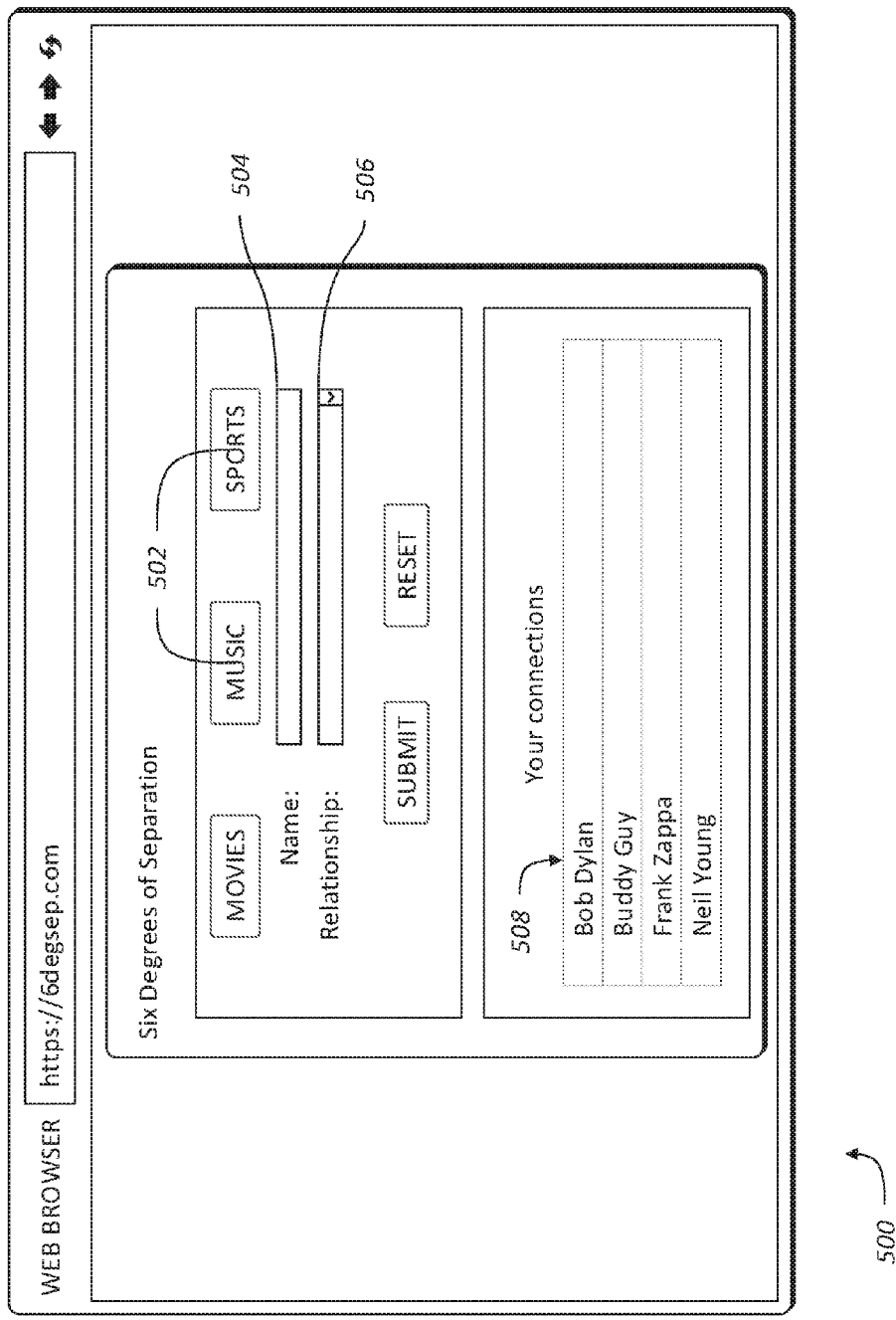
FIG. 5 is a mock-up view of a screen for a user to enter a potential social connections into an example system for verification and mapping of social connections.

In the example shown in FIG. 5, a mock-up of a potential interface 500 to system 300 is provided. Interface 500 includes a category selector 502, a field 504 to enter and search for a name or phrase, a selector 506 to designate the type of asserted relationship between a user 306 and person 310 once identified via field 504, and controls for submitting a connection request. Below field 504 and selector 506 is a list 508 of the various connections to user 306. Interface 500 thus forms the basis for users 306 making connection requests to other existing persons 310.

Category selector 502 is intended to allow a user to narrow the field of search for other existing persons 310 to particular related categories. In FIG. 5, these categories relate to celebrities, and include movies, music and sports. However, it should be understood that these categories are arbitrary. Where system 300 is implemented in a business context, the list of categories in category selector 502 would dramatically differ. In other implementations, category selector 502 may be omitted.

Field 504 is used for entering the name of an existing person 310 with whom user 306 wishes to connect. Search capabilities may be added to enhance user's 306 ability to located the desired existing person 310. Selector 506 preferably provides a predetermined list of possible acceptable relationships between user 306 and selected existing person 310. Such predetermined relationships can vary depending upon the selected category, predetermined requirements for connections, as well as requests from the existing person 310. In some implementations, existing person 310 may be able to specifically enter acceptable relationship types that user 306 must possess prior to being allowed to connect with existing person 310. For example, for an existing user 310 who is a celebrity, pre-determined acceptable relationship types may include being friends with the celebrity or another user who is connected to the celebrity, having been within 10 feet of the celebrity, having attended at least two events or performances featuring the celebrity or by the celebrity, or having attended one performance of the celebrity. In other implementations, selector 506 could instead be implemented as a text box to allow free-form description of the relationship between user 306 and existing person 310. Still further, some implementations may allow user 306 to include other media, such as one or more photographs, sound clips, videos, documents, files, etc., in their connection requests in addition to text, to be provided to person 310. If a connection request is approved, other implementations of system 300 may allow a greater number or additional media and/or media types to be submitted between user 306 and person 310. Still further implementations may place limits on transfers, such as a per-session limit, to keep storage usage on servers to a manageable level.

Figure 6:
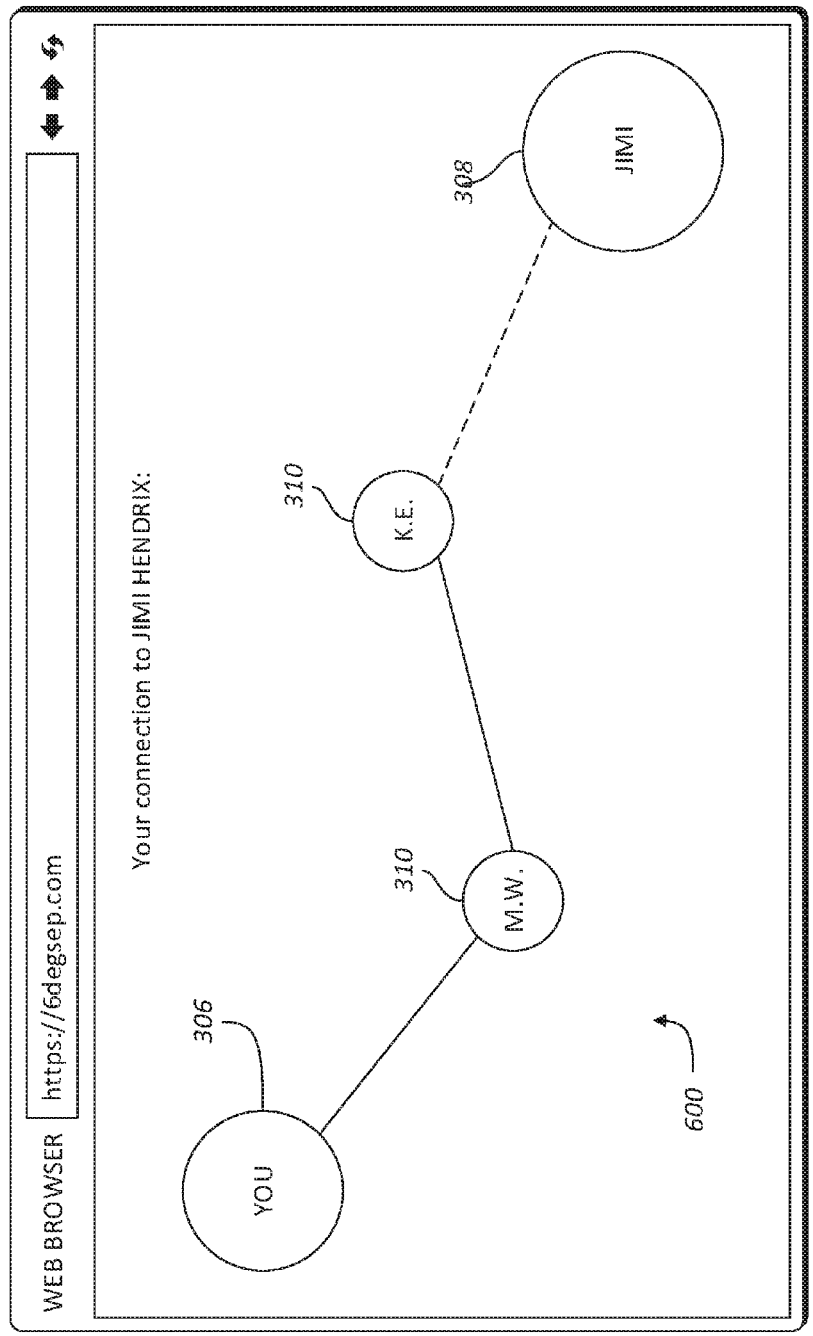
FIG. 6 is a mock-up view of a screen showing a graph of connections linking a user to a target entity that can be generated by the example system for verification and mapping of social connections.

Referring now to FIG. 6, an example visual graph 600 of the connections between user 306 and selected target entity 308 is shown. Similar to the path shown in FIG. 4, user 306 connects to target entity 308 via two existing persons 310. Visual graph 600 can be generated by user 306 selecting a target entity 308, and requesting that system 300 generate visual graph 600. Considering FIG. 4, visual graph 600 could optionally display multiple paths between user 306 and target entity 308 where multiple possible connection paths exist. Alternatively, visual graph 600 could offer controls that allow user 306 to toggle through possible connection paths. Still other possible options could include providing a shortest path preference, where visual graph 600 by default would display the connection path between user 306 and target entity 308 that has the fewest intermediate connections. Visual graph 600 could optionally be configured so that each name entry for existing person 310 and target entity 308 are hyperlinks, where clicking on one of the links will allow user 306 to initiate a new connection request and/or message the existing person 310 or target entity 308, provided that existing person 310 and/or target entity 308 have either not established criteria for connection, or user 306 meets established criteria.

Although not shown in the figures, FIG. 6 is generated by a user 306 simply selecting a target entity 308 from a list of available users in system 300. System 300 then computes the graph as described above, showing a path that includes persons 310 with whom user 306 has an existing connection, and then additional chain or chains of users 310 with whom user 306 is not yet connected leading to target entity 308. Graph 600 may use different lines between persons 310 with whom user 306 is connected and other persons 310, so that user 306 can visually see any additional connections he or she may need to make to get connected to target entity 308.

Figure 7:
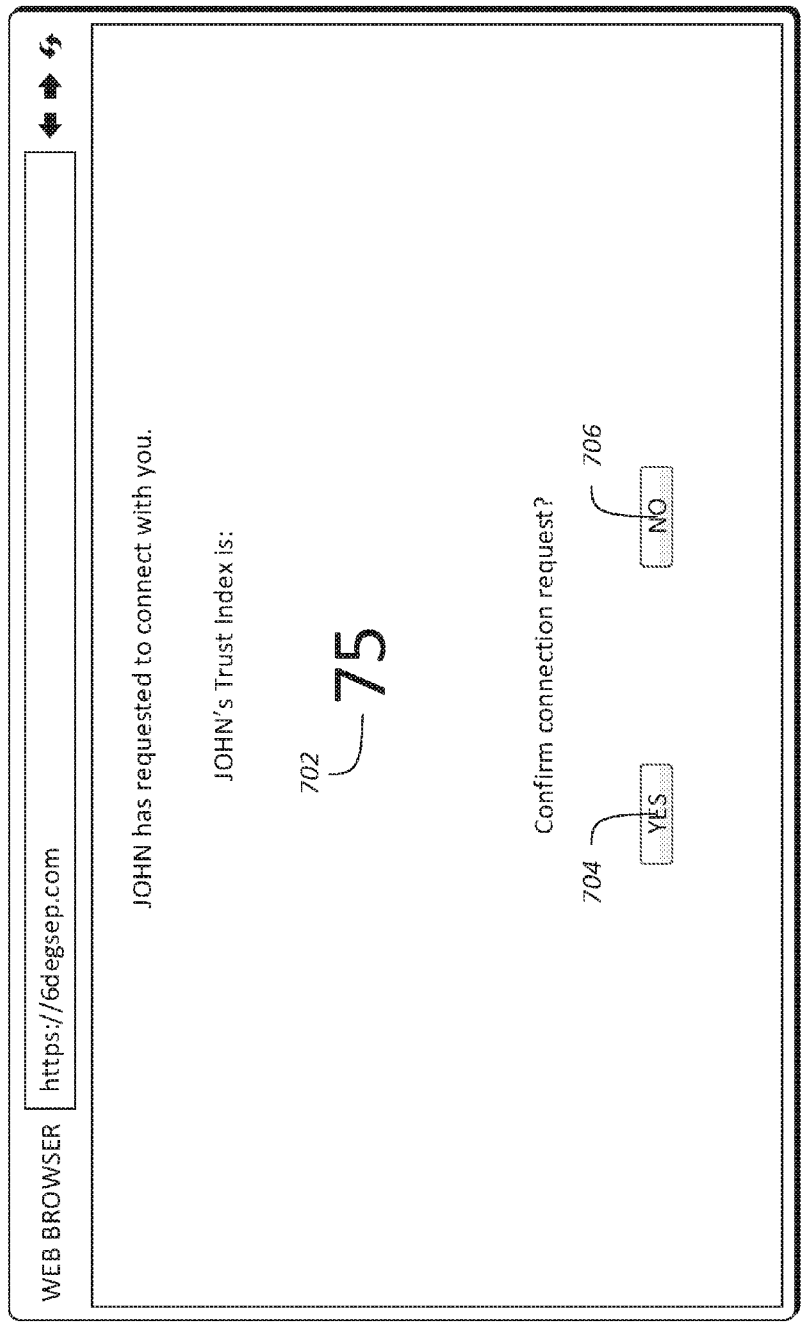
FIG. 7 is a mock-up view of a screen showing a connection request and trust index of a user requesting a connection seen by the requestee that can be generated by the example system for verification and mapping of social connections.

In FIG. 7, a mock-up possible display 700 seen by an existing person 310 who has received a connection request from a user 306 is depicted. In display 700, a trust index 702 is displayed, along with options to confirm 704 or deny 706 the request. If person 310 confirms 704 the connection request, then user 306 is connected in database 304 to existing person 310, and existing person 310 would appear in list 508 for user 306 as a connection. Conversely, if person 310 denies 706 the request, then user 306 will not be connected and, depending upon the implementation of system 300, may not receive notification of denial. Trust index 702 is optionally displayed to person 310. In one possible embodiment, trust index 702 is scaled from 0 to 100, with 100 being absolutely trustworthy, and 0 being untrustworthy. Some embodiments may omit displaying trust index 702, and still other embodiments may use trust index 702 as a threshold amount for determining whether user 306 can send a connection request to person 310. Where trust index 702 is used as a threshold, display of trust index 702 may be omitted to person 310.

A person skilled in the relevant art will recognize that FIGS. 5-7 are only possible implementations of portions of system 300's user interface, and assume a web-based implementation using a web browser. Appearance and layout of components, controls, and displayed information may all vary substantially between implementations of system 300 without deviating from the disclosed invention. Implementations that are mobile-platform centric may use a dedicated app to render the user interface. Furthermore, system 300 may have other screens not disclosed herein for functionality such as inputting new users and information associated with new users, individual user profile/account information management, system administration functions including database maintenance and establishing system parameters such as use of trust index 702, connection criteria, inter-user messaging, etc. The layout and configuration of such functionality is well known in the art relating to social media, web design, and general system maintenance.

System 300 may optionally include inter-user messaging functionality. User 306 may be allowed to message other existing persons 310 or targeted entity 308. Messaging may be restricted by number and/or criteria. For example, system 300 may be configured to only allow messaging from users with a minimum trust index 702. Such minimum threshold could be established on a system-wide basis, a per-user basis, or both. Other possible limits are a maximum number of messages allowed to be sent per person 310, and/or message content restrictions. These limits could be set by person 310, or implemented on a system-wide basis.

Figure 8:
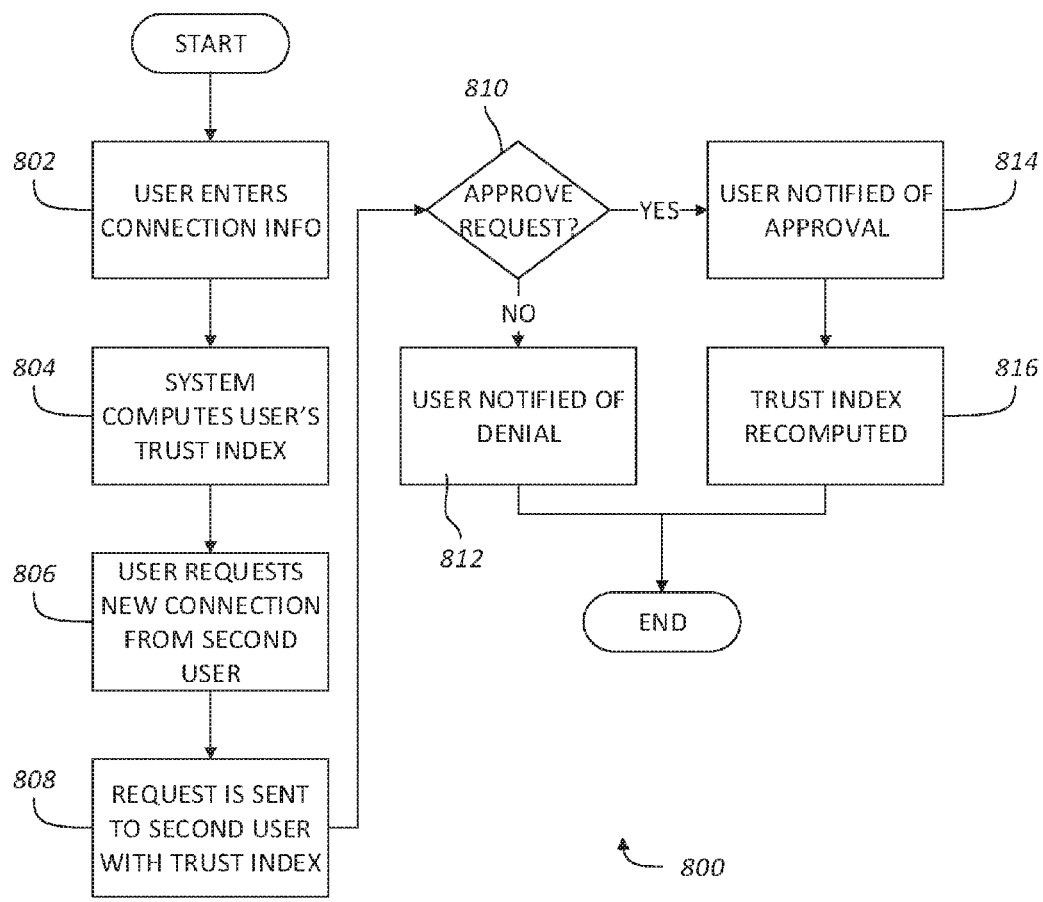
FIG. 8 is a flowchart of the steps taken by an example method for verification and mapping of social connections.

Turning attention to FIG. 8, a method 800 of using and operating system 300 with respect to establishing connections will now be described. Method 800 includes a first step 802 where a user 306, having already set up an account, optionally enters information about any existing connections, connections with other persons 310 on other social media platforms, connections with other persons 310 in real life, and/or other similar connections. In step 804, system 300 computes a trust index 702 for user 306. User 306 can then request a connection with another existing person 310 in step 806, which is sent to existing person 310 in step 808. Existing person 310 can approve or deny the request in step 810. If the request is denied, in step 812 user 306 can optionally be notified of the denial. Should existing person 310 approve the connection request, then user 306 is notified of the approval in step 814 and, in some implementations, trust index 702 for user 306 can be recomputed in step 816.

With the exception of steps 802 and 804, method 800 is iteratively performed each time user 306 requests a new connection.

In first step 802, a new user 306 may sign up with system 300, providing any information requested by system 300. The specific information will vary depending upon the particular implementation of system 300, and can include personal information such as name, address, date of birth, e-mail, etc. Other fundamental information will include login credentials such as a username and password combination that user 306 supplies to access system 300, modify their profile, submit connection requests, etc. For purposes of computing an initial trust index 702, system 300 can preferably be configured to have user 306 supply information regarding the user's existing contacts and connections. Examples of such information could include user 306 supplying system 300 with user 306's credentials to access various other existing social media sites, many of which provide APIs to allow third parties to access site information. System 300 could then retrieve user 306's connection information for further evaluation and processing. In other implementations of system 300, this information could be used to expedite onboarding of user 306; in such an implementation a new user 306 would need only supply credentials from another social media site, such as logging in using Facebook®, at which point system 300 would use Facebook® profile information to create user 306's account and determine an initial trust index 702, as well as to optionally suggest possible connections. Other connection information could also be supplied, such as persons who user 306 may know in real life. Where such information is sought, system 300 may require further validation of such connections.

In step 804, system 300 uses user 306's profile and connection information to compute an initial trust index 702. Trust index 702 is intended to prevent user 306 from inflating their performance or otherwise "gaming" system 300 to obtain greater connections or connections with high-status users that user 306 would not otherwise be able to obtain. This allows system 300 to more accurately model real life dynamics of interpersonal connections. Trust index 702 is preferably a function that accepts as input a user's 306 set of friends, existing connections, and any other pertinent information along with a set of evaluation criteria and heuristics specific to a particular implementation of system 300, and returns a numerical value representing the computed trustworthiness of user 306. Preferably, this is a number between 0 (least trustworthy) and 100 (most trustworthy), as discussed above. The actual algorithms used to compute the trust index 702 can be tailored to the specific needs of a given implementation of system 300, and thus can be modified or fine tuned to achieve desired results depending upon the context in which system 300 is deployed. For example, where system 300 is deployed in a social context, viz. to reflect popular connections to celebrities, the algorithms and weights used to compute trust index 702 may be radically different than those used where system 300 is deployed in a business context, such as to describe networks between persons sitting on multiple corporate boards. In such a context, user 306 may already be considered to be relatively trustworthy as opposed to system 300 in a context where user 306 may be a member of the general populace, and thus of unknown trustworthiness.

Heuristics for evaluating user's 306 trustworthiness can and will vary from implementation to implementation of system 300. Such criteria include: 1) We are more likely to trust claims of a friend, rather than a stranger. Thus, for a user 306, trustworthiness (as expressed in the trust index)

can be elevated when user 306 is connected to other persons who themselves are known to be trustworthy. Existing users who are connected with user 306 and who are known to be honest and unlikely to associate with dishonest persons in turn can impute trustworthiness to user 306. The opposite can also be held true; connections with others who are relatively untrustworthy could potentially have a negative effect on user 306's trust index. 2) Each person has an anticipated number of friends, and deviations from thus number can reflect trustworthiness. A user 306 that has an increasingly large number of Internet-based friends should have the weight accorded those friends in computing the trust index decreased, as it unlikely user 306 is actually in a meaningful relationship with a significant number of their Internet-based friends. Similarly, an unexpectedly low number of friends can indicate potential untrustworthiness. In either case, the user's 306 trust index will effectively be decreased, as connections with high trust indexes will not hold as great a weight. 3) A person's stature impacts the number of likely friends. Simply put, the higher a public profile a user 306 has, the more likely the person is to have a high number of friends and/or connections. Thus, a user 306 who is determined to have a significant public profile will be permitted to have a higher than normal number of friends (Internet or otherwise) before the weight of such friends' trust indices is diminished.

As a further example of the heuristics for evaluating user's 306 trustworthiness, the following hierarchy of trust criteria can be employed in some implementations, particularly those where a targeted person 308 is a celebrity: The most trusted persons are, for example, those who can have their connection to a celebrity verified in historical records and facts. Other trusted connections are, for example, the members of a musical group, because they have obvious strong connection. Such information is also verifiable via public record. More most trusted connections are, for example, the members of a baseball or soccer team, etc., because they have (almost certainly) been "within 10 feet" of every other member of the team at one time or another. Other trusted connections are persons 310 who both claim to be friends with yet another person 310. For example, any network of friends, who are willing to vouch for each other.

There is also a "negative hierarchy" which can serve reduce user 306's trust index 702. For example, a regular person who claims to be connected to, say, more than ten (10) persons 310 who are celebrities and/or 100 ordinary persons 310 is unlikely. Still further, as user 306's trust index 702 increases, system 300 could optionally allow user 306 to claim connections to a greater number of persons 310, on the basis of user 306 simply being apparently more trustworthy. This works the other way: if user 306 has no connections to other persons 310 (regardless of whether possessing celebrity status), but claims to be connected to many celebrity-level persons 310, user 306's trust index 702 would be close or equal to zero. If user 306 has no connections, then system 300 will not permit them to link to a person 310 who is a celebrity (e.g. target person 308). Additional algorithms may be deployed in system 300 to further prevent automated "fishing" for connection information in the database. A users 306 with a persistently low trust index 702, despite multiple connection attempts to other persons 310 may ultimately be blocked from using system 300.

In step 806, user 306 can submit a request to another existing person 310 to connect. System 300 may be configured to only allow connections where user 306 has a trust index that is above a predetermined threshold. This threshold may be established on a system-wide basis, or may be established by each existing person 310 personally, so as to act as a per-user filter against users 306 that are not sufficiently trustworthy. Additionally or alternatively, person 310 may require that a user 306 desiring to connect meet certain criteria established by person 310 before user 306 can send a connection request to person 310. As with a trust threshold, such criteria may also be established on a system-wide basis. Examples of such criteria are limiting connections to only to those who are immediately connected with existing connections to user 306. Referring to FIG. 6, for example, user 306 would not be able to submit a friend request to JIMI (target entity 308), but could only submit a connection request to K.E., who is a direct connection to M.W., to whom user 306 is directly connected. This restriction does not necessarily apply to graph 600 in FIG. 6; a user 306 would still be able to select a target entity 308 and view a path of connections to target entity 308. This raises the problem of establishing an initial series of connections for a new user 306. Such problems could be resolved by allowing initial connection requests to be sent to those existing persons 310 that user 306 is already connected to on an external site, and/or by using a trust index threshold for initial ad hoc connections.

Still another possible way to moderate connection requests is to require some sort of verification or qualification, especially where the request recipient is a person 310 with a high profile, such as a public figure, actor, musician, politician, etc. Examples of such qualifiers may include a user 306 having attended 1 or 2 or more events involving person 310; being within 10 feet of person 310; and/or being a friend. System 300 could be implemented such that user 306 can self-report their qualification, and such qualification will only be accepted without verification if user 306 has a sufficiently high trust index 702. If trust index 702 is not sufficiently high, user 306 may be required to submit additional verification, or may not be allowed to connect. A form of this approach to verification could also be implemented as a solution to a new user 306 establishing an initial round of connections.

If a connection request is allowed, person 310 is notified of the connection request and, as described above, could be supplied additional information about requesting user 306. Additional information may include user 306's current trust index 702, purported qualifications for user 306 to connect with person 310, user 306's personal details, etc., and/or any other information that could be useful to person 310 in evaluating the request, or pertinent to the specific implementation of system 300. Person 310 then decides whether to allow or deny the request in step 810.

Depending upon whether the request is allowed or denied, user 306 may be notified of the decision in steps 812 or 814. In some implementations, user 306 may not be notified if person 310 determines to deny a connection request.

Following an approved connection request, in step 814 the trust index 702 of user 306 is recomputed to take into account the new connection to person 310, considering person 310's trust index and stature. Trust index 702 is also preferably recomputed for person 310 who has accepted the connection request, taking into consideration the trust index of requesting user 306. Furthermore, in some implementations of system 300 the trust indices 702 of every user could be made available for inspection by all other users. In still other implementations, each user 306 may be able to view the trust index of those persons 310 whom user 306 may be allowed to submit a connection request.

Furthermore, in a preferred implementation of system 300, trust index 702 is recomputed on a frequent basis.

Preferably, trust index 702 will be recomputed every time the trust index of a person 310 to which user 306 is connected is updated or changed. As the trust index of connections is initially used to compute user 306's trust index 702 (as described above), it is appropriate to update user 306's trust index 702 when the trust indices of one or more connected persons 310 updates. Some implementations of system 300 can dedicate one or more processes or threads to continual refreshing and updating of all trust indices 702 in the background as the various connections in system 300 dynamically change over time, so that trust indices 702 accurately reflect the current trustworthiness of all system users, including user 306.

System 300 may allow persons 310 to defriend or disconnect from other users. Where such a defriending or disconnection takes place, system 300 may further recompute the trust indices of person 310 and disconnected user 306 in light of the disconnection. Further embodiments of system 300 may also weight a disconnection differently than an accepted connection request for purposes of trust index computation, and still further embodiments may bias a disconnection weighting depending upon stated or provided reasons for disconnection, e.g. an event or transgression by user 306 such as a misrepresented connection or fraudulent request may result in a greater lowering of the recomputed trust index 702 than a simple disconnection from a user 306 due to inactivity.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A system for mapping social connections between a user and a target entity, comprising:
    a processor capable of executing software instructions;
    a storage unit in communication with the processor, wherein the storage unit includes:
        a database to store therein connection information between existing users of a social media platform, including the target entity; and
        software instructions that when executed by the processor, cause the system to:
            add the user to the database;
            add or identify connections between the user and existing users to or in the database;
            compute a trust index for the user based on the connections between the user and the existing users in the database;
            receive a request from the user to connect to the target entity in the database;
            transmit the request to the target entity;
            evaluate whether to allow the connection between the user and the target entity based upon the user's trust index; and
            establish a connection between the user and the target entity based on the evaluation.

2. The system of claim 1, wherein the software instructions when executed by the processor, further cause the system to re-compute the trust index for the user based on the connection between the user and the target entity.

3. The system of claim 1, wherein the software instructions when executed by the processor, further cause the system to create a graph of connections between the user, the existing users, and the target entity.

4. The system of claim 3, further comprising a user interface to display a visual depiction of the graph of connections between the user, the existing users, and the target entity.

5. The system of claim 1, wherein the software instructions when executed by the processor, further cause the system to evaluate whether to allow the connection request to be transmitted to the target entity based on selected criteria.

6. The system of claim 1, wherein the target entity is selected from a group consisting of: a publicly known person, an employee, a business executive, an organization, an organization board, a corporation, and a corporation board.

7. The system of claim 6, wherein the user can message existing users only within parameters prescribed by the existing users.

8. The system of claim 1, further comprising software instructions to allow the user to message existing users in the database.

9. The system of claim 1, wherein the software instructions that when executed by the processor, cause the system to receive a request from the user to connect to the target entity in the database, cause the system to receive the request from the user to connect to the target entity in the database; and
    wherein the software instructions that when executed by the processor, cause the system to establish a connection between the user and the target entity, cause the system to establish the connection between the user and the target entity based on the evaluation.

10. A method for mapping a social connection between a user and a target entity, comprising:
    receiving via a user interface of a computer information about a plurality of persons, where one of the plurality of persons is the target entity;
    receiving via the user interface information about connections between the plurality of persons and the target entity;
    receiving via the user interface information about the user's connections with the plurality of persons;
    computing a trust index for the user based on the user's connections with the plurality of persons;
    validating the user's connection with the target entity based upon criteria specified by the target entity and the user's trust index;

creating a graph of connections between the user and the target entity based on the information about connections between the user and the plurality of persons, and between the plurality of persons and the target entity; and displaying the graph on the user interface.

11. The method of claim 10, further comprising exchanging one or more messages between the user and the target entity.

12. The method of claim 11, wherein the number and content of the messages exchanged between the user and the target entity is limited according to criteria established by the target entity.

13. The method of claim 10, further comprising recomputing the user's trust index following validation and approval of a connection request from the user.

14. The method of claim 13, wherein the connection request from the user is automatically denied if the user's trust index is below a threshold.

15. The method of claim 13, further comprising:
receiving one or more subsequent requests to add additional persons to the plurality of persons; and
recomputing the user's trust index following receipt of each subsequent request.

16. The method of claim 10, wherein receiving information further comprises storing the received information into a database.

17. The method of claim 16, wherein receiving via the user interface further comprises receiving information via a web browser displaying the user interface.

18. A system for mapping social connections between a user and a target entity, comprising a server computer further comprising:
a processor capable of executing computer instructions;
a communications device in data communication with the server's processor and a network; and
a storage unit in data communication with the server's processor, the storage unit containing:
a database in which to store information about a plurality of persons, including the target entity, the information further comprising a computed trust index for the user;
computer instructions for receiving information for storage in the database about the user, including a connection between the user and the target entity, the connection being subject to validation based upon criteria set by the target entity and the user's trust index; and
computer instructions for determining a graph of connections linking the user to the target entity; and
a client computer further comprising:
a processor capable of executing computer instructions;
a communications device in data communication with the client's processor and the network so as to be able to communicate with the server computer; and
a storage unit in data communication with the client's processor, the storage unit containing instructions for displaying a depiction of the graph of connections via a user interface of the client computer responsive to computer instructions executed by the client computer.

19. The system of claim 18, wherein the user interface is displayed on the client computer via a web browser.

20. The system of claim 19, wherein the information about a plurality of persons further comprises login credentials corresponding to each of the plurality of persons so that each of the plurality of persons can log into the server computer to view or modify the information.

21. The system of claim 20, wherein the user interface allows the user to send a message to the target entity, provided the message complies with criteria established by the target entity.

* * * * *